(12) United States Patent
Krishnan

(10) Patent No.: US 6,599,638 B1
(45) Date of Patent: Jul. 29, 2003

(54) COLLOIDALLY STABILIZED EMULSIONS

(75) Inventor: Venkataram Krishnan, Cary, NC (US)

(73) Assignee: Dow Reichhold Specialty Latex LLC, Research Triangle Park, NC (US)

( * ) Notice: Subject to any disclaimer, the term of this patent is extended or adjusted under 35 U.S.C. 154(b) by 66 days.

(21) Appl. No.: 09/657,707

(22) Filed: Sep. 8, 2000

Related U.S. Application Data

(60) Provisional application No. 60/153,441, filed on Sep. 10, 1999.

(51) Int. Cl.[7] ............................................. B32B 27/08
(52) U.S. Cl. ............................ 428/474.4; 428/479.3; 428/479.6; 524/503; 524/459; 526/202
(58) Field of Search .................. 428/474.4, 479.3, 428/479.6; 524/503, 375, 459; 526/207

(56) References Cited

U.S. PATENT DOCUMENTS

| | | | |
|---|---|---|---|
| 3,365,408 A | 1/1968 | Ohara ........................ 260/29.6 |
| 4,045,398 A | 8/1977 | Dahms ....................... 260/29.3 |
| 4,170,582 A | 10/1979 | Mori et al. ................. 260/29.6 |
| 4,179,537 A | 12/1979 | Rykowski ................... 427/387 |
| 4,257,935 A | 3/1981 | Sekiguchi et al. ......... 260/29.7 |
| 4,265,796 A | 5/1981 | Mueller-Mall et al. .... 260/29.6 |
| 4,287,329 A | 9/1981 | Heimberg ................... 526/202 |
| 4,336,172 A | 6/1982 | Marquardt et al. ......... 524/555 |
| 4,339,552 A | 7/1982 | Lindemann ................. 524/459 |
| 4,384,096 A | 5/1983 | Sonnabend ................. 526/313 |
| 4,384,661 A | 5/1983 | Page et al. .................. 222/394 |
| 4,397,968 A | 8/1983 | Eck et al. ................... 523/305 |
| 4,417,016 A | 11/1983 | Cline et al. ................. 524/156 |
| 4,477,613 A | 10/1984 | Evans et al. ................. 524/77 |
| 4,495,329 A | 1/1985 | Blair et al. .................. 524/774 |
| 4,510,019 A | 4/1985 | Bartelloni ................... 162/141 |
| 4,528,315 A | 7/1985 | Eck et al. ................... 524/458 |
| 4,623,462 A | 11/1986 | Urig et al. .................. 210/496 |
| 4,670,181 A | 6/1987 | Mollinger et al. .......... 252/186 |
| 4,904,753 A | 2/1990 | Watts et al. ................. 528/137 |
| 4,937,284 A | 6/1990 | Bergström ................... 525/57 |
| 4,999,239 A | 3/1991 | Iacoviello et al. .......... 428/288 |
| 5,001,011 A | 3/1991 | Plueddemann .............. 428/447 |
| 5,006,573 A | 4/1991 | Plueddemann .............. 523/214 |
| 5,100,948 A | 3/1992 | Avdin et al. ................ 524/425 |
| 5,141,983 A | 8/1992 | Hasegawa et al. .......... 524/457 |
| 5,155,193 A | 10/1992 | Georges et al. ........... 526/230.5 |
| 5,190,997 A | * 3/1993 | Lindemann et al. ........... 524/44 |
| 5,200,459 A | 4/1993 | Weih et al. ................. 524/459 |
| 5,244,695 A | 9/1993 | Davidowich et al. ..... 427/389.9 |
| 5,296,627 A | 3/1994 | Tang et al. .................... 558/34 |
| 5,300,555 A | 4/1994 | Weih et al. ................. 524/571 |
| 5,308,910 A | 5/1994 | Yuki et al. .................. 524/503 |
| 5,352,720 A | 10/1994 | Aydin et al. ................ 524/162 |
| 5,354,803 A | 10/1994 | Dragner et al. ............. 524/503 |
| 5,385,973 A | 1/1995 | Marciandi et al. .......... 524/730 |
| 5,428,095 A | 6/1995 | Swidler ....................... 524/389 |
| 5,434,216 A | 7/1995 | Mudge et al. .............. 524/803 |
| 5,444,112 A | 8/1995 | Carnahan .................... 524/272 |
| 5,451,635 A | 9/1995 | LaFleur et al. ............... 525/57 |
| 5,461,104 A | 10/1995 | Daniel et al. ............... 524/505 |
| 5,470,924 A | 11/1995 | Ryan ........................... 525/501 |
| 5,491,209 A | 2/1996 | Helmer ....................... 526/320 |
| 5,496,884 A | 3/1996 | Weih et al. ................. 524/503 |
| 5,502,089 A | 3/1996 | Bricker et al. ................ 524/44 |
| 5,519,084 A | 5/1996 | Pak-Harvey et al. ........ 524/503 |
| 5,520,997 A | 5/1996 | Pourahmady et al. ....... 428/228 |
| 5,539,015 A | 7/1996 | Horii et al. ................. 523/102 |
| 5,629,370 A | 5/1997 | Freidzon .................... 524/503 |
| 5,830,934 A | 11/1998 | Krishnan ...................... 524/43 |
| 5,900,451 A | 5/1999 | Krishnan et al. ........... 524/502 |

FOREIGN PATENT DOCUMENTS

| | | | |
|---|---|---|---|
| CA | 2182202 | 1/1995 | ........... C02T/43/04 |
| EP | 0 516 360 A1 | 12/1992 | ........... C08F/36/04 |
| EP | 0 640 629 | 6/1994 | ......... C08F/246/00 |
| FR | 1265549 | 5/1961 | |
| GB | 2 099 000 A | 4/1981 | ............. C08F/2/44 |
| JP | 57-1800617 | 3/1982 | ............. C08F/2/24 |
| JP | 2028 203 A | 7/1988 | .......... C08F/18/08 |
| JP | 2 196880 | 1/1989 | ............. C08F/2/38 |
| JP | 05059106 A | 3/1993 | ............. C08F/2/24 |
| JP | 06128443 A | 5/1994 | ........... C08L/33/00 |
| JP | 6179705 | 6/1994 | ............. C08F/2/24 |
| JP | 07070989 A | 3/1995 | .......... D21H/19/56 |
| WO | WO94/22671 | 10/1994 | ........... B32B/27/04 |

OTHER PUBLICATIONS

Yuki et al; "The Role of Polyvinyl Alcohol in Emulsion Polymerization", *Polymer International* 30:4 513–517 (1993).

* cited by examiner

*Primary Examiner*—Robert Dawson
*Assistant Examiner*—Christopher M Keehan
(74) *Attorney, Agent, or Firm*—Myers Bigel Sibley & Sajovec, PA

(57) ABSTRACT

A filter substrate impregnated with an emulsion polymer, the emulsion polymer being substantially devoid of phenolics and stabilized using a protective colloid.

7 Claims, No Drawings

COLLOIDALLY STABILIZED EMULSIONS

CROSS-REFERENCE TO RELATED APPLICATIONS

The instant application claims priority to U.S. Provisional Application Ser. No. 60/153,441 filed Sep. 10, 1999, the disclosure of which is incorporated herein by reference in its entirety.

FIELD AND BACKGROUND OF THE INVENTION

The present invention relates to colloidally stabilized emulsions, and particularly colloidally stabilized emulsions having reduced or no phenolics.

Phenolics (e.g., phenol-formaldehyde resins), have been used as adhesives, laminates, molding materials, paints and the like. Of particular interest is the use of phenolics as adhesives or binders in non-woven substrates and papers. More specifically, phenolics are used in bonding of refractory shapes; fiber bonding such as in filters; felt bonding; binding of friction products such as brake pads; in papermaking; in insulation; in roofing products; and in the binding of foundry sands such as abrasives. Of particular interest is the use of phenolics in filters. Typically, the filter is provided by impregnating a continuous roll of paper with a phenolic resole in the form of an alcohol solution of a condensate of phenol with formaldehyde. The impregnated and saturated paper is heated to remove the solvent (alcohol) and corrugated to increase surface area. The resin is then cured in an oven and the paper is rolled again. The rolls of the impregnated paper are provided to the filter manufacturer for completion of the process which includes pleating and final curing. Such filters are used in the both air and oil filtering systems in stationary and mobile internal combustion engines.

Phenolics, however, have disadvantages such as high phenol and formaldehyde levels, brittleness when fully cured, slow curing characteristics, instability and poor shelf life. Moreover, phenolics, particularly water-based phenolics, are difficult to use to impregnate fiber substrates. In such impregnation, co-solvents such as alcohols, must be used and then removed.

To this end, it would be desirable to substantially eliminate, or in the alternative, substantially reduce the amount of phenolics used in products and with substrates wherein phenolics have traditionally been used as binders or adhesives.

SUMMARY OF THE INVENTION

The present invention provides compositions wherein phenolics are substantially eliminated, substantially reduced or replaced by the use of a colloidally stabilized emulsion polymer. By using the colloidally stabilized polymer of the invention and eliminating or replacing the use of phenolics, a wide variety of polymers having crosslinkable functionality such as provided by crosslinkers such as epoxies, polyisocyanates, polyurethanes, N-methylol acrylamide, melamineIformaldehyde and the like, can be used or blended together while providing properties comparable to those of polymers having phenolics or of phenolics alone.

Alternatively, the colloidally stabilized emulsion polymers, when blended with phenolics, are more stable and compatible with phenolics as compared to surfactant stabilized emulsions. By compatibility, it is meant that the emulsion polymers, when blended with phenolics, remain stable without coagulating or gelling or becoming a paste over longer periods of time. Thus, the blended product can be used over extended periods of time without concern for instability or degradation of performance. Moreover, the need to use undesirable solvents is eliminated.

DETAILED DESCRIPTION OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It is believed that a wide variety of polymers in emulsion form can be colloidally stabilized, particularly with polyvinyl alcohol, and optionally blended with phenolics. Specific polymers in emulsion form include polyvinylacetate, vinylacetate-ethylene(VAE), vinyl acrylics, epoxies, urethanes, acrylics, styrene acrylics, butadiene copolymers, and hybrid emulsions of combinations of the foregoing. The present invention can be used in systems to replace phenolics wherein phenolics are used alone, or can be used in systems wherein phenolics are used with other polymers. In the latter, the phenolics can be substantially eliminated or can be substantially reduced.

Of particular interest are emulsion polymers that have high levels (i.e., greater than about 15 percent by weight) of nitrogen-containing monomers such as acrylonitrile. By being able to increase the level of acrylonitrile, properties such as oil and grease resistance can be improved without adversely affecting the physical properties contributed to by the phenolics.

As stated above, it is desirable to substantially eliminate the use of phenolics; however, phenolics may still be used at a reduced level. The phenols employed in the formation of the phenolic resins generally include any phenol which as heretofore been employed in the formation of phenolic resins and which are not substituted at either the two ortho positions or at the one ortho and the para position. Such unsubstituted positions are necessary for the polymerization reaction to occur. Substituted phenols employed in the formation of the phenolic resins include: alkyl substituted phenols, aryl-substituted phenols, cycloalkyl-substituted phenols, alkenyl-substituted phenols, alkoxy substituted phenols, aryloxy substituted phenols, and halogen-substituted phenols. Specific examples of suitable phenols include: phenol, o-cresol, m-cresol, p-cresol, 3,5-xylenol, 3-4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol component can include any of the aldehydes heretofore employed in the formation of phenolic resins and include, for example, formaldehyde, and benzaldehyde. In general, the aldehydes employed have the formula R'CHO wherein R' is a hydrogen or hydrocarbon radical of 1–8 carbon atoms. A particularly preferred phenolic is Resafen 8121 available from Resana, Sao Paulo, Brazil.

With respect to the polymers, of particular interest are the ones with aliphatic conjugated dienes. Suitable aliphatic conjugated dienes are $C_4$ to $C_9$ dienes and include, for example, butadiene monomers such as 1,3-butadiene, 2-methyl-1,3-butadiene, 2-chloro-1,3-butadiene, and the like, such as described in U.S. Pat. No. 5,900,451 to Krishnan et al., the disclosure of which is incorporated herein by reference in its entirety. Blends or copolymers of the diene monomers can also be used. The aliphatic conjugated diene is used in an amount, based on total weight of the starting monomers, from about to 1 to about 99 percent by weight, preferably from about 5 to about 30 percent by weight, and most preferably from about 5 to about 15 percent by weight. A particularly preferred aliphatic conjugated diene is 1,3-butadiene.

Suitable non-aromatic unsaturated monocarboxylic ester monomers include acrylates and methacrylates. The acrylates and methacrylates may include functional groups such as amino groups, hydroxy groups, epoxy groups and the like. Exemplary acrylates and methacrylates include methyl acrylate, methyl methacrylate, ethyl acrylate, ethyl methacrylate, butyl acrylate, butyl methacrylate, 2-ethylhexyl acrylate, glycidyl acrylate, glycidyl methacrylate, hydroxyethyl acrylate, hydroxyethyl methacrylate, hydroxypropyl acrylate, hydroxypropyl methacrylate, isobutyl methacrylate, hydroxybutyl acrylate, hydroxybutyl methacrylate, 3-chloro-2-hydroxybutyl methacrylate, n-propyl methacrylate and the like. Exemplary amino-functional methacrylates include t-butylamino ethyl methacrylate and dimethylamino ethyl methacrylate. Suitable non-aromatic dicarboxylic ester monomers are dialkyl fumarates, itaconates and maleates, with the alkyl group having two to eight carbons, with or without functional groups. Specific monomers include diethyl and dimethyl fumarates, itaconates and maleates. Other suitable non-aromatic dicarboxylic ester monomers include di(ethylene glycol) maleate, di(ethylene glycol) itaconate, bis(2-hydroxyethyl) maleate, 2-hydroxyethyl methyl fumarate, and the like.

The non-aromatic unsaturated mono- or dicarboxylic ester monomer is used in an amount, based on total weight of the starting monomers, preferably from about 5 to about 95 percent by weight, and most preferably from about 20 to about 80 percent by weight. A particularly preferred non-aromatic unsaturated monocarboxylic ester monomer is methyl methacrylate.

Various aromatic unsaturated monomers may be used and include, but are not limited to, styrene and styrene derivatives such as alphamethylstyrene, p-methyl styrene, vinyltoluene, ethylstyrene, tert-butyl styrene, monochlorostyrene, dichlorostyrene, vinyl benzyl chloride, fluorostyrene, alkoxystyrenes (e.g., paramethoxystyrene) and the like. Mixtures of the above may be used. Preferably, styrene is employed. The aromatic unsaturated monomer is preferably used from about 5 to about 95 percent based on the total monomer weight, and more preferably from about 20 to about 80 percent by weight.

Exemplary nitrogen-containing monomers which may be used include, for example, acrylonitrile, methacrylonitrile, acrylamide, and methacrylamide. Acrylonitrile is preferred. Mixtures of the above may be used. The nitrogen-containing monomer is preferably used, for example, in an amount ranging from about 5 to about 95 percent based on the total weight of the monomers, and more preferably from about 15 to about 80 percent by weight.

Known and conventional protective colloids may be employed in the emulsion polymer such as partially and fully hydrolyzed polyvinyl alcohols; cellulose, ethers, e.g., hydroxymethyl cellulose, hydroxyethyl cellulose, hydroxypropyl cellulose, starch ad start derivatives, carboxymethyl cellulose (CMC); the natural and synthetic gums, e.g., gum tragacanth and gum Arabic, polyacrylic acid; acrylates; poly(vinyl alcohol)co(vinyl amine) copolymers and the like. Partially and fully hydrolyzed polyvinyl alcohols such as those available from Air Products, sold under the trademark Airvol™ are preferred and are preferably employed from about 0.1 to about 10 percent based on the weight of the total monomer, more preferably from about 0.5 to 5 percent, and most preferably from about 1 to about 4 percent.

In accordance with the invention, a polymerizable surfactant which contains ethylenic unsaturation is used and is copolymerized with the other monomers during emulsion polymerization. As a result, the surfactant is incorporated in to the backbone of the polymer and serves to stabilize the latex. Examples of suitable surfactants containing ethylenic unsaturation are provided in U.S. Pat. No. 5,296,627 to Tang et al., the disclosure of which is incorporated by reference herein in its entirety.

Various polymerizable surfactants are also described in U.S. Pat. No. 5,900,451 to Krishnan et al. A preferred polymerizable surfactant is SAM 186N™ sold by PPG Industries, Inc. of Pittsburgh, Pa. The polymerizable surfactant may be used in various amounts. Specifically, the stabilized emulsion polymer may include between about 0.1 and about 5 percent polymerizable surfactant based on the monomer weight, more preferably from about 1 to about 4 weight percent, and most preferably from about 2 to about 3 weight percent.

Conventional surfactants may be used in conjunction with the surfactant having ethylenic unsaturation described herein. Such surfactants are preferably of the anionic and nonionic type. The selection of these surfactants is apparent to one skilled in the art. Preferred nonionic surfactants are selected from the family of alkylphenoxypoly(ethyleneoxy) ethanols where the alkyl group typically various from $C_7$–$C_{18}$ and the ethylene oxide units vary from 4–100 moles. Various preferred surfactants in this class include the ethoxylated octyl and nonyl phenols, and in particular ethoxylated nonyl phenols with a hydrophobic/lipophilic balance (HLB) of 15–19. Non-APE (alkylphenol ethoxylate) surfactants such as ethoxylated alcohols, for example, Abex 2525, are also preferred. Anionic surfactants can be selected from the broad class of sulfonates, sulfates, ethersulfates, sulfosuccinates, diphenyloxide disulfonates, and the like, and are readily apparent to anyone skilled in the art.

An unsaturated mono- or dicarboxylic acid monomer may also be included in the stabilized emulsion polymer. These monomers include, but are not limited to, acrylic acid, methacrylic acid, itaconic acid, fumaric acid, and maleic acid. Derivatives, blends, and mixtures of the above may also be used. The unsaturated mono- or discarboxylic acid monomer may be used in an amount ranging from about 0 to about 15 percent based on the total monomer weight, and more preferably from about 0 to about 5 weight percent.

Additional comonomers can be added to the stabilized emulsion polymer. Included among such additional comonomers are monoethylenically unsaturated substituted aliphatic hydrocarbons such as vinyl chloride, and vinylidene chloride; aliphatic vinyl esters such as vinyl formate, vinyl propionate, vinyl butyrate, vinyl versatate and vinyl neodecanoate.

The stabilized emulsion polymer can include additives to enhance its various physical and mechanical properties; the selection of which is readily apparent to one skilled in the art. For example, crosslinking agents can be included such as vinylic compounds (e.g., divinyl benzene); allyllic compounds (e.g., allyl methacrylate, diallyl maleate); multifunctional acrylates (e.g., di, tri and tetra (meth)acrylates); self-crosslinking monomers such as N-methylol acrylamide, N-methylol methacrylamide and $C_1$ to $C_4$ ethers of these monomers respectively (e.g., N-iso[butoxymethoxy] methacrylamide), acrylamido glycolic acid and its esters, and alkyl acrylamido glycolate alkyl ethers (e.g., methylacrylamido glycolate methyl ether). The crosslinking agents can be included in amounts of up to about 15 percent by weight, and preferably from about 3 to about 8 percent by weight. Additional monomers such as silanes can be included to improve specific properties such as latex stability, solvent resistance, as well as adhesion and strength and are described, for example, in U.S. Pat. No. 5,830,934 to Krishnan, the disclosure of which is incorporated herein by reference in its entirety.

Initiators which facilitate polymerization are typically used and include, for example, materials such as persulfates, organic peroxides, peresters, and azo compounds such as azobis(isobutyronitrile) (AIBN). Persulfate initiators are preferred and include, for example, potassium persulfate and ammonium persulfate.

Reductants may be employed in the polymerization, and are typically employed in combination with the initiator as part of a redox system. Suitable reductants include sodium bisulfite, erythorbic acid, ascorbic acid, sodium thiosulfate, sodium formaldehyde sulfoxylate (SFS), and the like.

Other additives which may be used include other natural and synthetic binders, fixing agents, wetting agents, plasticizers (e.g., diisodecyl phthalate), softeners, foam-inhibiting agents, froth aids, other crosslinking agents (e.g., melamine formaldehyde resin, epoxies, polyisocyanates, etc.), flame retardants, dispersing agents (e.g., tetrasodium pyrophosphate), pH adjusting components (e.g., ammonium hydroxide), sequestering or chelating agents (e.g., ethylene diaminetetraacetic acid (EDTA)) and other components. The selection of any of these additives is readily apparent to one skilled in the art.

One use of the reduced phenolic/butadiene blend is, for example, the fabrication of filters (e.g., oil filters). In the first or treating step, a continuous roll of paper is conventionally impregnated with the binder in the form of an alcohol solution. When a phenolic is used, the saturated paper is heated to remove the alcohol (solvent). In the present invention, the alcohol solution is not needed and this step is eliminated. The treated paper is then corrugated for the purpose of increasing surface area. The corrugated sheet is subsequently conveyed through an oven in order to advance the cure of the resinous impregnate to a fusible intermediate or B stage, and then the corrugated sheet is made into a filter.

The following examples are provided to illustrate the present invention, and should not be construed as limiting the scope thereof.

EXAMPLES

Example 1

A polyvinyl alcohol stabilized butadiene emulsion is prepared comprising the following:

| COMPONENT | GRAMS |
|---|---|
| Deionized Water | 2560.00 |
| EDTA Chelating Agent | 0.80 |
| Dowfax 2A1 Surfactant | 3.20 |
| Airvol 103 PVOH | 32.00 |
| Abex 2525 Surfactant | 16.00 |
| Tamol 731A Dispersing Agent | 0.80 |
| Sam 186N Polymerizable Surfactant | 16.00 |
| Methoxy polyethylene glycol methacrylate | 32.00 |
| Ammonium Persulfate Initiator | 0.80 |
| Butadiene | 160.00 |
| Tertiary Dodecyl Mercaptan | 6.40 |
| Acrylonitrile | 320.00 |
| Styrene | 448.00 |
| Acrylic Acid | 16.00 |
| Methylmethacrylate | 480.00 |
| Butylacrylate | 80.00 |
| N-methylol arylamide | 64.00 |
| Diammonium Phosphate | 4.00 |

Wet performance testing was achieved by boiling the test samples in distilled water for 5 minutes. After the allocated time, the samples were removed and blotted dry but kept wet during testing by covering them with moist absorbent towels.

Tensile data was generated on substrate tested in the machine direction. Sample size was 1"×5", with an extension rate of 10 inches/minute, and samples were tested on an Instron 1125.

The testing was done on No. 4 Whatman Filter Paper. Each sheet had a 20 percent add on of the composition of Example 1 is diluted to 22 percent total solids, was dried for 4 minutes at 225° F. and was allowed to condition overnight in a constant temperature/humidity room. Then each sheet was cured at 350° F. in a forced air oven for the cure times of the tables.

| Cure Time | Max Load (lbf) (std. dev.) | Max Stn (elong) (std. dev.) | Max Str (psi) (std. dev.) |
|---|---|---|---|
| | Example 1 - Wet Tensile Strength | | |
| 1' | 11.97 (1.07) | 4.027 (0.686) | 25.75 (7.25) |
| 2' | 13.14 (0.16) | 4.210 (0.259) | 27.52 (3.1) |
| 3' | 14.57 (0.47) | 4.487 (0.105) | 34.36 (1.25) |
| 4' | 14.04 (0.52) | 4.257 (0.229) | 31.59 (3.17) |
| 5' | 14.15 (0.63) | 4.211 (0.298) | 31.28 (4.50) |
| 10' | 13.77 (0.79) | 3.846 (0.185) | 27.01 (2.74) |
| | Example 1 - Dry Tensile Strength | | |
| 1' | 26.86 (1.57) | 2.929 (0.259) | 42.61 (9.17) |
| 2' | 29.50 (1.22) | 3.022 (0.183) | 52.95 (4.99) |
| 3' | 26.64 (1.17) | 2.792 (0.229) | 41.61 (6.13) |
| 4' | 27.80 (2.03) | 2.747 (0.396) | 46.08 (11.37) |
| 5' | 28.19 (0.68) | 2.746 (0.258) | 46.41 (6.43) |
| 10' | 26.83 (2.01) | 2.471 (0.317) | 38.80 (9.68) |

Examples 2–7

Various amounts a phenolic available as Resafen 8121 from Resana, Sao Paulo Brazil, were added to Example 1, along with phenolic only, and the tensile strengths measured. The amounts added are as follows:

| Example | Amt (%) of Example 1 | Amt (%) of Phenolic |
|---------|----------------------|---------------------|
| 2       | 98                   | 2                   |
| 3       | 96                   | 4                   |
| 4       | 94                   | 6                   |
| 5       | 92                   | 8                   |
| 6       | 90                   | 10                  |
| 7       | 50                   | 50                  |
| 8       | 0                    | 100                 |

The wet tensile strength results are as follows:

Example 2

| % add-on | Cure Time @ 350 F. | Max Load (std. dev.) | Max elong (std. dev.) | Max psi (std. dev.) |
|----------|--------------------|-----------------------|------------------------|----------------------|
| 19.2 | 1'  | 12.11 (0.38) | 4.394 (0.002) | 27.12 (1.40) |
| 19.2 | 2'  | 14.84 (0.19) | 4.669 (0.105) | 36.66 (1.29) |
| 19.2 | 3'  | 15.00 (0.81) | 4.441 (0.311) | 34.61 (4.06) |
| 19.6 | 4'  | 14.28 (0.44) | 4.393 (0.183) | 32.35 (2.13) |
| 19.6 | 5'  | 14.38 (0.57) | 4.396 (0.183) | 32.89 (2.77) |
| 19.6 | 10' | 14.26 (0.58) | 3.967 (0.107) | 29.32 (1.75) |

Example 3

| % add-on | Cure Time @ 350 F. | Max Load (std. dev.) | Max elong (std. dev.) | Max psi (std. dev.) |
|----------|--------------------|-----------------------|------------------------|----------------------|
| 19.9 | 1'  | 14.12 (0.12) | 4.821 (0.28)  | 36.62 (2.32) |
| 19.9 | 2'  | 15.38 (1.14) | 4.898 (0.345) | 39.14 (6.60) |
| 19.9 | 3'  | 14.88 (0.27) | 4.271 (0.106) | 31.13 (0.99) |
| 19.4 | 4'  | 16.35 (1.40) | 4.454 (0.529) | 38.14 (7.74) |
| 19.4 | 5'  | 16.33 (0.83) | 4.303 (0.184) | 36.45 (5.24) |
| 19.4 | 10' | 16.11 (0.81) | 4.027 (0.258) | 31.90 (4.20) |

Example 4

| % add-on | Cure Time @ 350 F. | Max Load (std. dev.) | Max elong (std. dev.) | Max psi (std. dev.) |
|----------|--------------------|-----------------------|------------------------|----------------------|
| 19.4 | 1'  | 14.00 (0.55) | 4.897 (0.311) | 36.02 (3.47) |
| 19.4 | 2'  | 17.65 (0.97) | 5.081 (0.406) | 45.86 (6.85) |
| 19.4 | 3'  | 17.52 (0.83) | 4.806 (0.433) | 43.47 (5.51) |
| 19.3 | 4'  | 19.10 (0.93) | 4.822 (0.280) | 47.26 (4.76) |
| 19.3 | 5'  | 18.50 (0.71) | 4.577 (0.183) | 43.58 (3.37) |
| 19.3 | 10' | 19.14 (1.10) | 4.347 (0.313) | 41.73 (4.38) |

Example 5

| % add-on | Cure Time @ 350 F. | Max Load (std. dev.) | Max elong (std. dev.) | Max psi (std. dev.) |
|----------|--------------------|-----------------------|------------------------|----------------------|
| 19.4 | 1'  | 13.35 (1.08) | 4.578 (0.539) | 32.29 (6.96) |
| 19.4 | 2'  | 18.63 (0.50) | 5.172 (0.175) | 49.29 (3.15) |
| 19.4 | 3'  | 19.49 (0.95) | 4.898 (0.405) | 48.49 (5.48) |
| 19.8 | 4'  | 20.02 (0.72) | 4.668 (0.317) | 48.06 (4.52) |
| 19.8 | 5'  | 22.05 (0.70) | 4.943 (0.335) | 57.85 (5.97) |
| 19.8 | 10' | 20.79 (1.49) | 4.531 (0.347) | 48.06 (8.20) |

Example 6

| % add-on | Cure Time @ 350 F. | Max Load (std. dev.) | Max elong (std. dev.) | Max psi (std. dev.) |
|----------|--------------------|-----------------------|------------------------|----------------------|
| 19.5 | 1'  | 15.84 (0.45) | 5.127 (0.259) | 42.05 (0.281) |
| 19.5 | 2'  | 19.36 (0.62) | 5.188 (0.212) | 50.93 (4.13)  |
| 19.5 | 3'  | 20.16 (1.05) | 4.623 (0.231) | 48.82 (5.46)  |
| 19.3 | 4'  | 22.59 (0.69) | 5.188 (0.212) | 60.15 (3.89)  |
| 19.3 | 5'  | 23.05 (0.93) | 4.852 (0.235) | 58.31 (5.02)  |
| 19.3 | 10' | 22.55 (0.86) | 4.578 (0.150) | 54.30 (3.40)  |

Example 7

| % add-on | Cure Time @ 350 F. | Max Load (std. dev.) | Max elong (std. dev.) | Max psi (std. dev.) |
|----------|--------------------|-----------------------|------------------------|----------------------|
| 19.9 | 1'  | 13.84 (0.99) | 5.035 (0.57)  | 33.45 (4.27)  |
| 19.9 | 2'  | 21.98 (0.85) | 4.669 (0.235) | 54.29 (5.16)  |
| 19.9 | 3'  | 23.79 (1.74) | 4.073 (0.347) | 52.04 (9.66)  |
| 20.1 | 4'  | 26.68 (0.78) | 3.891 (0.229) | 57.95 (4.95)  |
| 20.1 | 5'  | 15.26 (0.45) | 3.526 (0.092) | 49.22 (2.34)  |
| 20.1 | 10' | 26.06 (2.42) | 3.066 (0.525) | 44.42 (11.01) |

Example 8

| Product | Cure Time @ 350 F. | Max Load (std. dev.) | Max elong (std. dev.) | Max psi (std. dev.) |
|---------|--------------------|-----------------------|------------------------|----------------------|
| Resafen 8121 | 1'  | 11.72 (1.6.29) | 1.466 (0.185)  | 6.711 (2.118) |
|              | 2'  | 13.11 (1.11)   | 1.190 (0.132)  | 6.031 (0.937) |
|              | 3'  | 13.00 (0.70)   | 1.283 (0.00)   | 5.490 (0.509) |
|              | 4'  | 9.7222 (1.440) | 0.9778 (0.1058)| 2.622 (0.618) |
|              | 5'  | 12.24 (1.05)   | 1.097 (0.183)  | 4.955 (0.621) |
|              | 10' | 12.05 (0.73)   | 1.160 (0.104)  | 4.533 (0.598) |

Example 9

A polyvinyl alcohol stabilized emulsion having more N-methylol acrylamide and no butylacrylate is prepared, comprising the following:

| COMPONENT | GRAMS |
|-----------|-------|
| Deionized Water | 2560.00 |
| EDTA Chelating Agent | 0.80 |
| Dowfax 2A1 Surfactant | 3.20 |
| Airvol 103 PVOH | 32.00 |
| Abex 2525 Surfactant | 16.00 |
| Tamol 731A Dispersing Agent | 0.80 |
| Sam 186N Polymerizable Surfactant | 16.00 |
| Methoxy polyethylene glycol methacrylate | 32.00 |
| Ammonium Persulfate Initiator | 0.80 |
| Butadiene | 240.00 |
| Tertiary Dodecyl Mercaptan | 6.40 |
| Acrylonitrile | 320.00 |
| Styrene | 704.00 |
| Acrylic Acid | 16.00 |
| Methylmethacrylate | 176.00 |
| N-methylol arylamide | 112.00 |
| Diammonium Phosphate | 4.00 |

The wet tensile strength at different cure rates was as follows:

| Cure Time 350° F. | Lbf (std. dev.) | Elong (std. dev.) | Psi (std. dev.) |
|---|---|---|---|
| 1' | 17.41 (0.42) | 5.310 (0.299) | 45.57 (4.37) |
| 2' | 17.58 (1.08) | 5.004 (0.212) | 44.59 (6.09) |
| 3' | 17.47 (0.93) | 4.822 (0.279) | 41.23 (5.58) |
| 4' | 16.89 (0.32) | 4.699 (0.106) | 38.49 (2.96) |
| 5' | 17.32 (0.62) | 4.699 (0.212) | 40.55 (2.73) |
| 10' | 16.99 (0.58) | 4.393 (0.183) | 38.19 (2.37) |

The above examples illustrate that compositions having no phenolic or reduced phenolic can provide physical properties comparable to conventional emulsion compositions having phenolics.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A filter comprising a filter substrate impregnated with polymer in emulsion form selected from the group consisting of vinyl acrylates, epoxies, urethanes, acrylics, styrene acrylics, butadiene copolymers and hybrid emulsions of combinations thereof, the polymer having crosslinkable functionality being substantially devoid of phenolics and provided by a self-crosslinking monomer selected from the group consisting of N-methylol acrylamide, N-methylol methacrylamide and $C_1$ to $C_4$ ethers thereof, and stabilized using a protective colloid.

2. The filter according to claim 1, wherein the protective colloid is a polyvinyl alcohol.

3. The filter according to claim 2, wherein the polyvinyl alcohol is fully hydrolyzed.

4. The filter according to claim 2, wherein the polyvinyl alcohol is partially hydrolyzed.

5. A filter comprising a filter substrate impregnated with polymer in emulsion form selected from the group consisting of vinyl acrylates, epoxies, urethanes, acrylics, styrene acrylics, butadiene copolymers and hybrid emulsions of combinations thereof, the polymer having crosslinkable functionality being substantially devoid of phenolics and provided by a self-crosslinking monomer selected from the group consisting of N-methylol acrylamide, N-methylol methacrylamide and $C_1$ to $C_4$ ethers thereof, and stabilized using a polyvinyl alcohol.

6. The filter according to claim 5, wherein polyvinyl alcohol is fully hydrolyzed.

7. The filter according to claim 5, wherein the polyvinyl alcohol is partially hydrolyzed.

\* \* \* \* \*